United States Patent [19]
Yu

[11] Patent Number: 5,825,928
[45] Date of Patent: Oct. 20, 1998

[54] DECODING APPARATUS FOR ERROR CONCEALMENT CONSIDERING MOTION DIRECTIONS OF MOVING IMAGES

[75] Inventor: Pil-ho Yu, Suwon, Rep. of Korea

[73] Assignee: Samsung Electronics Co., Ltd., Kyungki-Do, Rep. of Korea

[21] Appl. No.: 565,128

[22] Filed: Nov. 30, 1995

[30] Foreign Application Priority Data

Nov. 30, 1994 [KR] Rep. of Korea ................. 32218/1994

[51] Int. Cl.$^6$ ................................. G06K 9/36
[52] U.S. Cl. ................. 382/236; 382/233; 348/416; 348/402; 348/407; 348/413; 348/699
[58] Field of Search ..................... 382/232, 233, 382/236, 238, 107; 358/432, 433, 426, 261.2, 261.3, 430; 348/402, 416, 699, 407, 384, 390, 400, 401, 409, 415, 700, 413

[56] References Cited

U.S. PATENT DOCUMENTS

| | | | |
|---|---|---|---|
| 5,400,076 | 3/1995 | Iwamura | 348/416 |
| 5,512,952 | 4/1996 | Iwamura | 348/416 |
| 5,532,747 | 7/1996 | Yoon et al. | 348/416 |
| 5,570,199 | 10/1996 | Tanaka et al. | 348/407 |
| 5,614,958 | 3/1997 | Shikakura | 348/416 |

*Primary Examiner*—Edward L. Coles, Sr.
*Assistant Examiner*—Fan Lee
*Attorney, Agent, or Firm*—Sughrue, Mion, Zinn, Macpeak & Seas, PLLC

[57] ABSTRACT

A motion image decoding apparatus receives encoded image data which has first, second and third data regions, such as MPEG macroblocks which have predetermined sizes, and a motion vector for each of the data regions. The motion image decoding apparatus conceals errors in the first data region by generating an error signal and using a motion vector of a second data region which is located on a line preceding a line containing the first data region having the error and which is in a same picture as the first data region and also by using a motion vector corresponding to a third data region which is located in a column preceding the column containing the first data region having the error and which is also in a same picture as that of the first data region. If no error is generated in the first data region, the motion vector for that data region is used to perform motion compensation.

20 Claims, 2 Drawing Sheets

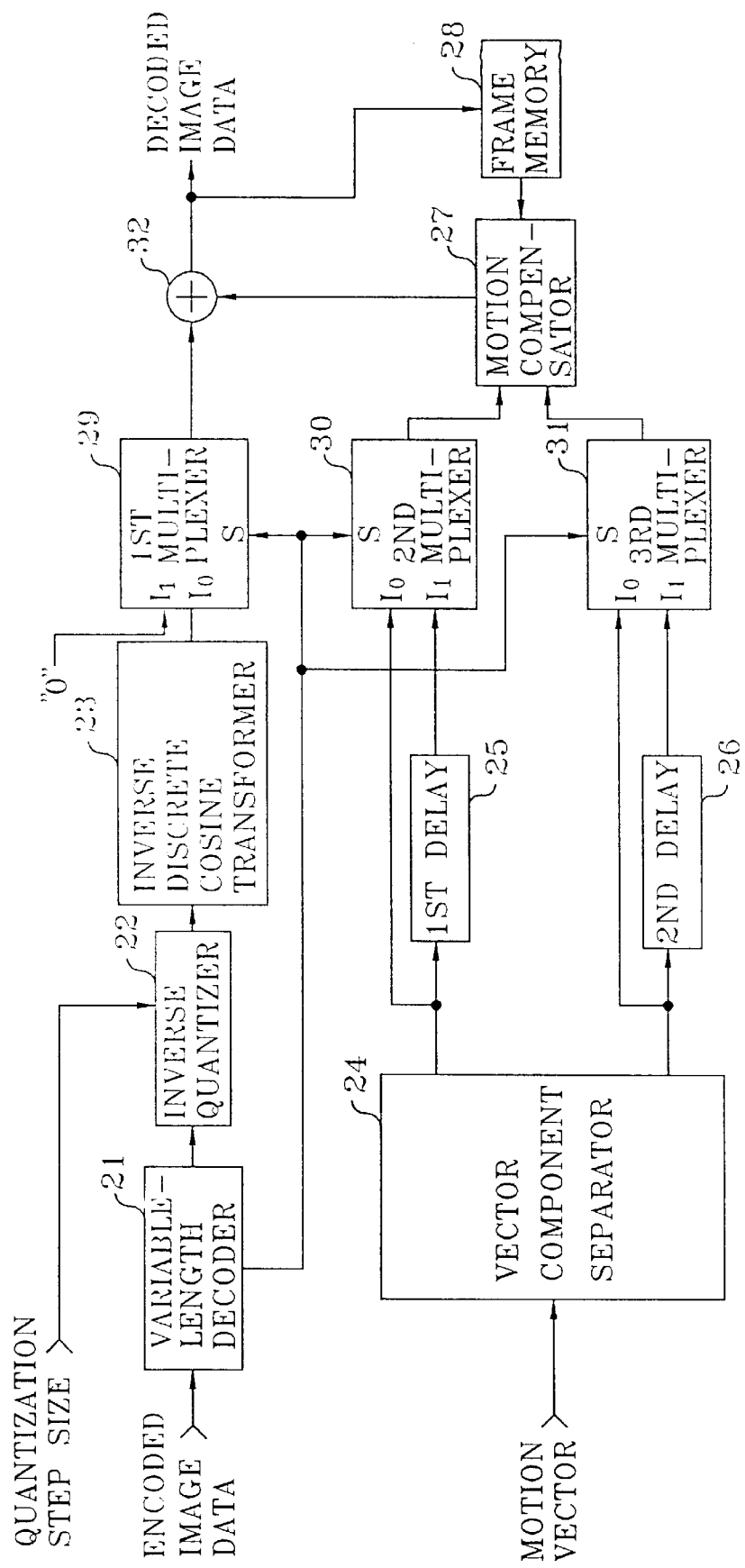

DECODING APPARATUS FOR ERROR CONCEALMENT CONSIDERING MOTION DIRECTIONS OF MOVING IMAGES

BACKGROUND OF THE INVENTION

1. Field of the Invention

The present invention relates to a decoding apparatus for image data, and more particularly, to a decoding apparatus for concealing image data in which an error has occurred in a reproduced picture, based on a direction of movement of a moving image.

2. Description of Related Art

The MPEG (Moving Picture Experts Group), which is an international standard for encoding moving image data, proposes an encoding apparatus which performs the following types of image data encoding: discrete cosine transform (DCT) quantization, variable-length-coding, motion estimation and motion compensation encoding and differential pulse code modulation (DPCM) for images divided into M(horizontal) × N(vertical) blocks.

FIG. 1 shows an apparatus for decoding image data encoded by the apparatus proposed by the MPEG. The apparatus of FIG. 1 outputs restored image data using encoded image data, a quantization step size and a motion vector which are transmitted from the MPEG encoding apparatus. A variable-length decoder 11 variable-length-decodes the input encoded image data, and an inverse-quantizer 12 inversely quantizes the variable-length-decoded image data according to the quantization step size. An inverse discrete cosine transformer 13 transforms the data output from inverse quantizer 12 into image data in a spatial domain. Meanwhile, a frame memory 15 stores a frame of image data output from an adder 16. A motion compensator 14 outputs to adder 16 image data from among the image data stored in frame memory 15, which has been designated by a motion vector. Adder 16 adds motion-compensated image data supplied from motion compensator 14 and the image data output from inverse discrete cosine transformer 13. The image data output from adder 16 is restored image data divided into N×N sized blocks of pixels. The data output from adder 16 is stored in frame memory 15 for motion compensation decoding.

The motion compensator 14 performs motion compensation in units of macroblocks, which follows a chroma format proposed by the MPEG. The chroma format divides a macroblock having four blocks into a luminance block Y, for representing a luminance component, and chrominance blocks Cb and Cr, for representing chrominance components. For example, each macroblock has four luminance blocks (4Y) and two chrominance blocks (1Cb and 1Cr) in a 4:4:0 macroblock structure. Because of such a chroma format, error concealment is generally performed in units of a macroblock. The simplest error concealment method replaces a macroblock in which an error has occurred, by a corresponding macroblock located in the same position but in the immediately preceding restored frame or field. However, when the error occurs in a macroblock which requires motion compensation, the above-described method which replaces a macroblock, does not sufficiently reflect the motion compensation. Thus, the effect of error concealment according to the proposed MPEG apparatus can be poor.

Another error concealment method for solving such a problem involves replacing a macroblock in which an error has occurred, by a motion-compensated macroblock using the motion vector of a macroblock from the line above the macroblock in which the error occurred. However, this method does not solve the problem where the error concealment effect is poor when there is little similarity between the macroblock having the error and the macroblock on the line above that macroblock having the error.

SUMMARY OF THE INVENTION

Therefore, to solve the above problems, it is an object of the present invention to provide a moving image decoding apparatus capable of more effectively concealing an error irrespective of the direction of movement of the data region in which the error is generated. This is accomplished by using not only the image information from the line above the data region having the error, but also image information in another data region which is located just in front of that same data region having the error, for performing error concealment of the data region having a predetermined size which includes the error.

Thus, to accomplish the above object of the present invention, there is provided a motion image decoding apparatus which receives encoded image data of an image having a plurality of pictures, wherein the encoded image data has first, second and third data regions having predetermined sizes and which receives a motion vector for each of the data regions, comprising decoding means for decoding the encoded image data and generating an error indication signal if an error is generated in image data of the first data region; vector component generation means for generating and outputting first and second vector components, wherein the first and second vector components are generated from the motion vector corresponding to the first data region if the error indication signal indicates no error, and the first vector component is generated from the motion vector corresponding to the second data region which is located on a line preceding a line containing the first data region and which is in a same picture as the first data region and the second vector component is generated from the motion vector corresponding to the third data region which is located in a column preceding a column containing the first data region and which is in a same picture as that of the first data region, if the error indication signal indicates an error; motion compensation means for compensating the image data of the first data region according to the first and second vector components output from the vector component generation means; selection output means for outputting the decoded image data of the first data region decoded by the decoding means when the error indication signal indicates no error and outputting null data with respect to the first data region when the error indication signal indicates an error; and adding means for adding the data output from the selection output means and decoded image data output from the motion compensation means.

BRIEF DESCRIPTION OF THE DRAWINGS

The preferred embodiments are described with reference to the following drawings, in which:

FIG. 2 is a block diagram showing an image decoding apparatus for decoding a moving image according to a preferred embodiment of the present invention.

DETAILED DESCRIPTION OF THE PREFERRED EMBODIMENT

Figure 1:
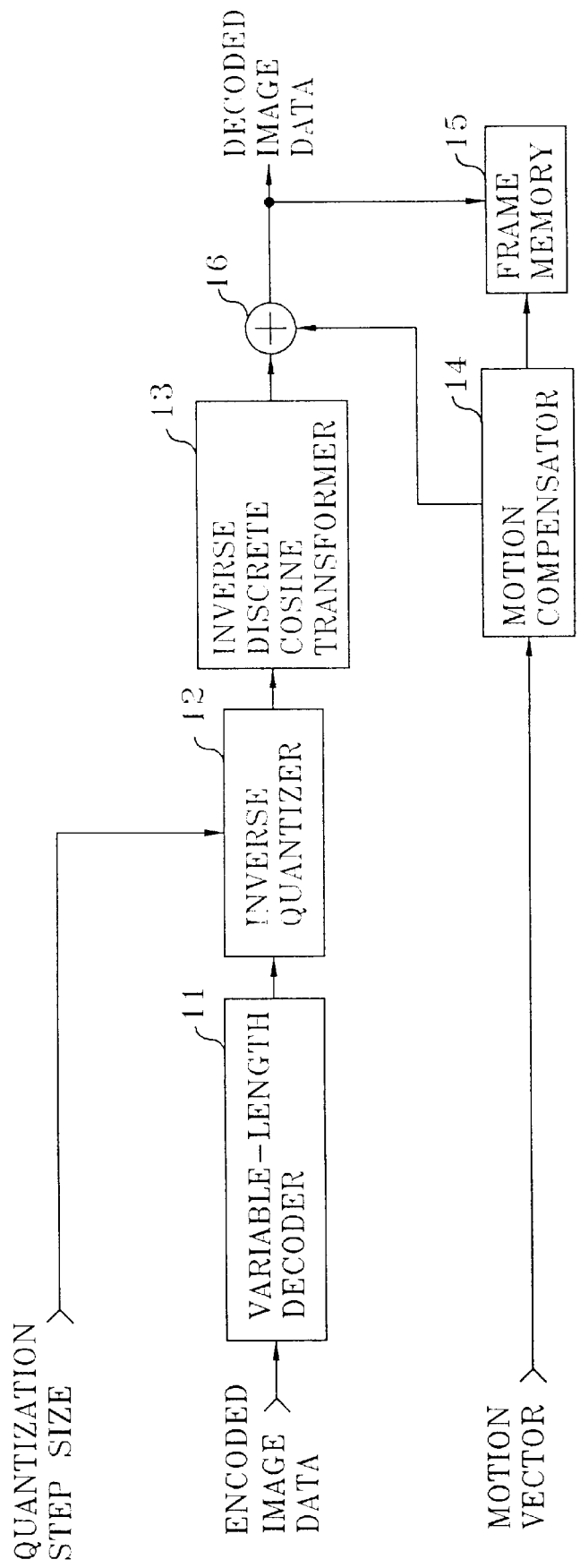
FIG. 1 is a block diagram showing a general image data decoding system.

A preferred embodiment of the present invention is described below in more detail with reference to the accompanying drawings.

According to the MPEG recommendations, a picture is composed of a plurality of slices, each of which includes a number of macroblocks. Each macroblock has a single corresponding motion vector thereto.

The present invention relates to error concealment with respect to a "macroblock" being a data region. The present invention employs motion vectors of neighboring macroblocks to calculate the motion vector for an error-generated macroblock, that is, a macroblock generated with an error. For example, an embodiment of the present invention uses both the horizontal component of the motion vector of a macroblock in the line immediately above the macroblock in which errors are generated, and the vertical component of the motion vector of a macroblock in the front of the macroblock in which errors are generated.

A decoding apparatus according to a preferred embodiment of the present invention is shown in FIG. 2, which conceals all errors by considering the direction of movement in a moving image. The apparatus of FIG. 2 produces restored image data by using encoded image data, a quantization step size and a motion vector which are transmitted from the encoding apparatus in the same manner as in the apparatus of FIG. 1. Further, the apparatus of FIG. 2 uses a motion vector corresponding to a data region adjacent to a first data region which has an error, and which has the same size as that of the first data region. The motion vector is used in determining image data for replacing the first data region, having a predetermined size, in which an error is generated. When the apparatus shown in FIG. 2 employs a date structure according to the MPEG standard, a motion vector is obtained for every macroblock unit. Therefore, assuming that the apparatus shown in FIG. 2 performs error concealment in units of a macroblock according to the MPEG standard, a preferred embodiment of the present invention is described below.

In FIG. 2, a variable-length decoder 21 receives input encoded motion image data and generates variable-length-decoded image data and an error indication signal. The image data output from variable-length decoder 21 is supplied to a first multiplexer 29 via an inverse quantizer 22 and an inverse discrete cosine transformer (DCT) 23 which operate in the same manner as those in the apparatus of FIG. 1. The error indication signal is applied to signal input select terminal S of multiplexers 29, 30 and 31. First multiplexer 29 selectively outputs null data and the image data supplied from inverse DCT 23 according to the error indication signal output from variable-length decoder 21. A vector component separator 24 separates an input motion vector into horizontal and vertical components. The horizontal component of the motion vector, output from vector component separator 24, is applied to a first delay 25 and a first input terminal $l_0$ of second multiplexer 30. The vertical component of the motion vector output from vector component separator 24 is input to a second delay 26 and to a first input terminal $l_0$ of third multiplexer 31.

First delay 25 delays the horizontal component of the input motion vector, and outputs the delayed result. First delay 25 synchronizes the horizontal component of the motion vector for a macroblock output from vector component separator 24 with the horizontal component of the motion vector for another macroblock located in the same column as that of the macroblock, but in the preceding line of the same image. The output data of first delay 25 is applied to a second input terminal $l_1$ of second multiplexer 30. Second multiplexer 30 selectively outputs the horizontal component of the motion vectors input to the first and second input terminals $l_0$ thereof, according to the error indication signal output from variable-length decoder 21.

Second delay 26 delays the vertical component of the motion vector output from vector component separator 24 and outputs the delayed result. Second delay 26 synchronizes the vertical component of the motion vector for a macroblock output from vector component separator 24 with the vertical component of the motion vector for another macroblock which is located in the same line as that of the macroblock, but in the preceding column of the same image as that of the macroblock. The output data of second delay 26 is applied to a second input terminal $l_1$ of third multiplexer 31. Third multiplexer 31 selectively outputs the vertical component of the motion vectors input to the first and second input terminals $l_0$ and $l_1$ thereof, according to the error indication signal output from variable-length decoder 21.

A motion compensator 27 reads out image data from a frame memory 28, in which the image data corresponds to a data region designated by the motion vector having horizontal and vertical components output from second and third multiplexers 30 and 31, respectively. Motion compensator 27 then outputs the read result to an adder 32. Adder 32 adds the image data output from first multiplexer 29 and the image data output from motion compensator 27. The image data output from adder 32 is fed back to frame memory 28 and then stored therein. The image data output from adder 32 is also output to an associated image system (not shown) which is located in subsequent portions of the apparatus shown in FIG. 2.

Operation of the apparatus shown in FIG. 2 is now described.

A motion vector is applied to vector component separator 24 shown in FIG. 2, for each macroblock to be decoded by variable-length decoder 21. Variable-length decoder 21 generates an error indication signal having a binary value of "1" when an error is generated in a first macroblock of the image data to be decoded, while it generates an error indication signal of "0" when an error is not generated in the first macroblock. The error indication signal is supplied to multiplexers 29, 30 and 31. The image data output from variable-length decoder 21 is inversely-quantized and inversely discrete-cosine-transformed by inverse quantizer 22 and inverse DCT 23 which control inverse quantization according to the input quantization step size. Then, the inversely discrete-cosine-transformed signal is applied to first input terminal $l_0$ of first multiplexer 29.

Meanwhile, vector component separator 24 receives a first motion vector corresponding to the first macroblock to be decoded by variable-length decoder 21, and separates the first motion vector into horizontal and vertical components. At the point in time when the horizontal component of the first motion vector is output from vector component separator 24 to second multiplexer 30, first delay 25 outputs a horizontal component of a second motion vector for a second macroblock which is located in the same column as that of the first macroblock, but in the preceding line of the same picture as that of the first macroblock (i.e., the line immediately above the first macroblock). Likewise, second delay 26 outputs the vertical component of a third motion vector for a third macroblock which is located in the preceding column of the same line of the same picture as that of the first macroblock (i.e., the column immediately in front of the first macroblock, so as to be synchronized with the vertical component of the first motion vector output from vector component separator 24.

First through third multiplexers 29, 30 and 31 select the data input via their first input terminals $l_0$ and output this selected data if the error indication signal applied to their select signal terminals S has a binary value of "0" indicating no error. On the other hand, if the error indication signal has a binary value of "1" indicating an error, first through third multiplexers 29, 30 and 31 select the data input via their second input terminals $l_1$, and output the selected data. The data output from first multiplexer 29 is input to adder 32, while the data output from second and third multiplexers 30 and 31 are input to motion compensator 27. Thus, if the error indication signal corresponding to the first macroblock has a binary value of "0," indicating no error has occurred, motion compensator 27 performs motion compensation based on the first motion vector corresponding to the first macroblock. On the contrary, if the error indication signal corresponding to the first macroblock has a binary value of "1," indicating an error has occurred, motion compensator 27 performs motion compensation based on the horizontal component of the second motion vector of the second macroblock and the vertical component of the third motion vector of the third macroblock.

Thus, when no error occurs the finally determined motion vector is the first motion vector corresponding to the first macroblock, and motion compensator 27 reads the image data of the macroblock which is designated by the first motion vector, among the image data stored in frame memory 28. Motion compensator 27 then supplies the read data to adder 32. In this case, adder 32 adds the image data supplied from inverse DCT 23 and the image data supplied from motion compensator 27. On the other hand, when an error occurs the finally determined motion vector is the horizontal component of the second macroblock and the vertical component of the third macroblock, and motion compensator 27 reads the image data from frame memory 28 for the macroblock which is designated by the new motion vector having such horizontal and vertical components, and supplies the read data to adder 32. In this case, adder 32 adds the motion-compensated image data supplied from motion compensator 27 and the null data output from multiplexer 29, since a "1" is input to multiplexer 29 causing terminal $l_1$ to be selected. The image data output from adder 32 is stored in frame memory 28, and is also supplied to an associated image system (not shown) which is connected to the FIG. 2 apparatus.

In another embodiment of the present invention, different from the above described embodiment, a vertical component of a motion vector for a macroblock which is located immediately above the macroblock in which an error is generated, and a horizontal component of a motion vector of a macroblock which is located in the preceding column of the macroblock in which the error is generated, are used for error-concealment motion-compensation. Such a modified embodiment will be apparent to a person skilled in the art to be within the scope of the present invention. Such a modified embodiment can be realized by modifying delays 25 and 26 for delaying the input vector components in the FIG. 2 apparatus.

As described above, the present invention uses the motion vector components of peripheral macroblocks which are adjacent to the data region in which an error is generated, to perform motion compensation with respect to the error-generated data region. Accordingly, the effect of such an error concealment with respect to the error-generated data region is heightened.

While only certain embodiments of the invention have been specifically described herein, it will apparent that numerous modifications may be made thereto without departing from the spirit and scope of the invention.

What is claimed is:

1. A motion image decoding apparatus which receives encoded image data of an image having a plurality of pictures, wherein the encoded image data has first, second and third data regions having predetermined sizes and which receives a motion vector for each of the data regions, comprising:

decoding means for decoding the encoded image data and generating an error indication signal if an error is generated in image data of the first data region;

vector component generation means for generating and outputting first and second vector components, wherein said first and second vector components are generated from the motion vector corresponding to the first data region if said error indication signal indicates no error, and said first vector component is generated from the motion vector corresponding to the second data region which is located on a line preceding a line containing the first data region and which is in a same picture as the first data region and said second vector component is generated from the motion vector corresponding to the third data region which is located in a column preceding a column containing the first data region and which is in a same picture as that of the first data region, if said error indication signal indicates an error;

motion compensation means for compensating said image data of the first data region according to said first and second vector components output from said vector component generation means;

selection output means for outputting the decoded image data of the first data region decoded by said decoding means when said error indication signal indicates no error and outputting null data with respect to the first data region when said error indication signal indicates an error; and adding means for adding the data output from said selection output means and decoded image data output from said motion compensation means.

2. The motion image decoding apparatus according to claim 1, wherein each of the data regions is a macroblock according to a data structure of the Moving Picture Experts Group (MPEG).

3. The motion image decoding apparatus according to claim 1, wherein said first vector component is a horizontal component of the motion vector and said second vector component is a vertical component of the motion vector.

4. The motion image decoding apparatus according to claim 1, wherein said first vector component is a vertical component of the motion vector and said second vector component is a horizontal component of the motion vector.

5. The motion image decoding apparatus according to claim 1, wherein said decoding means comprises a variable-length decoder which variable-length-decodes the encoded image data and generates said error indication signal based on said first data region of the variable-length-decoded image data.

6. The motion image decoding apparatus according to claim 1, wherein said second data region is located in an immediately preceding line of said first data region and in a same column as said first data region.

7. The motion image-decoding apparatus according to claim 1, wherein said third data region is located in an immediately preceding column of said first data region and in a same line as said first data region.

8. The motion image decoding apparatus according to claim 1, wherein said vector component generation means comprises:

a component separator for separating the received motion vector into said first and second vector components;

a first delay for delaying said first vector component of the motion vector of the second data region output from said component separator to be synchronized with said first vector component of the motion vector of the first data region;

a first multiplexer for selectively outputting one of said first vector component of the motion vector of the first data region output from said component separator and said first vector component of the motion vector of the second data region output from said first delay, to said motion compensation means according to said error indication signal;

a second delay for delaying said second vector component of the motion vector of the third data region output from said component separator to be synchronized with said second vector component of the motion vector of the first data region; and a second multiplexer for selectively outputting one of said second vector component of the motion vector of the first data region output from said component separator and said second vector component of the motion vector of the third data region output from said second delay, to said motion compensation means according to said error indication signal.

9. The motion image decoding apparatus according to claim 1, wherein said motion compensation means comprises:

a frame memory for storing decoded image data fed back from said adding means; and a motion compensator for outputting to said adding means image data in a data region from among said image data stored in said frame memory, corresponding to the motion vector composed of said first and second vector components output from said vector component generation means.

10. The motion image decoding apparatus according to claim 1, wherein said adding means feeds the added result back to said motion compensation means.

11. A motion image decoding apparatus which receives encoded image data of an image having a plurality of pictures, wherein the encoded image data has first, second and third data regions having predetermined sizes and which receives a motion vector for each of the data regions, comprising:

a decoder which decodes the encoded image data and generates an error indication signal if an error is generated in image data of the first data region;

a vector component separator which receives said error indication signal from said decoder and the motion vector, in which said vector component separator generates and outputs first and second vector components, wherein said first and second vector components are generated from the motion vector corresponding to the first data region if said error indication signal indicates no error, and said first vector component is generated from the motion vector corresponding to the second data region which is located on a line preceding a line containing the first data region and which is in a same picture as the first data region and said second vector component is generated from the motion vector corresponding to the third data region which is located in a column preceding a column containing the first data region and which is in a same picture as that of the first data region, if said error indication signal indicates an error;

a motion compensator connected to said vector component separator, wherein said motion compensator compensates said image data of the first data region according to said first and second vector components output from said vector component separator;

a selector which receives said decoded image data of the first data region decoded by said decoder and said error indication signal, and selectively outputs said decoded image data of the first data region and null data based on said error indication signal; and an adder receiving and adding the data selectively output from said selector and decoded image data output from said motion compensator.

12. The motion image decoding apparatus according to claim 11, wherein each of the data regions is a macroblock according to a data structure of the Moving Picture Experts Group (MPEG).

13. The motion image decoding apparatus according to claim 11, wherein said first vector component is a horizontal component of the motion vector and said second vector component is a vertical component of the motion vector.

14. The motion image decoding apparatus according to claim 11, wherein said first vector component is a vertical component of the motion vector and said second vector component is a horizontal component of the motion vector.

15. The motion image decoding apparatus according to claim 11, wherein said decoder is comprised of a variable-length decoder which variable-length-decodes the encoded image data and generates said error indication signal based on said first data region of the variable-length-decoded image data.

16. The motion image decoding apparatus according to claim 11, wherein said second data region is located in an immediately preceding line of said first data region and in a same column as said first data region.

17. The motion image-decoding apparatus according to claim 11, wherein said third data region is located in an immediately preceding column of said first data region and in a same line as said first data region.

18. The motion image decoding apparatus according to claim 11, wherein said vector component separator comprises:

a component separator for separating the received motion vector into said first and second vector components;

a first delay for delaying said first vector component of the motion vector of the second data region output from said component separator to be synchronized with said first vector component of the motion vector of the first data region;

a first multiplexer for selectively outputting one of said first vector component of the motion vector of the first data region output from said component separator and said first vector component of the motion vector of the second data region output from said first delay, to said motion compensator according to said error indication signal;

a second delay for delaying said second vector component of the motion vector of the third data region output from said component separator to be synchronized with said second vector component of the motion vector of the first data region; and a second multiplexer for selectively outputting one of said second vector component of the motion vector of the first data region output from said component separator and said second vector component of the motion vector of the third data region output from said second delay, to said motion compensator according to said error indication signal.

19. The motion image decoding apparatus according to claim 11, wherein said motion compensator comprises:

a frame memory for storing decoded image data fed back from said adder; and a motion compensation unit for outputting to said adder image data in a data region from among said image data stored in said frame memory, corresponding to the motion vector composed of said first and second vector components output from said vector component separator.

20. The motion image decoding apparatus according to claim 11, wherein said adder feeds the added result back to said motion compensator.

* * * * *